United States Patent [19]
Mueck

[11] Patent Number: 5,113,994
[45] Date of Patent: May 19, 1992

[54] CONVEYER LINE STRAIGHTENER

[76] Inventor: Edward A. Mueck, Box 326, Rte. 1, Viola, Ill. 61486

[21] Appl. No.: 617,559

[22] Filed: Nov. 26, 1990

[51] Int. Cl.$^5$ ............................................. B65G 47/24
[52] U.S. Cl. ................................. 198/395; 271/245; 198/399; 198/416
[58] Field of Search ................ 271/243, 245; 198/375, 198/382, 394, 395, 399, 434, 416

[56] References Cited

U.S. PATENT DOCUMENTS

| | | | |
|---|---|---|---|
| 3,308,923 | 3/1967 | Crawford | 198/395 |
| 3,347,180 | 10/1967 | Phillips, Jr. et al. | 198/394 X |
| 3,356,364 | 12/1967 | Grigereit | 271/245 X |
| 4,185,815 | 1/1980 | Abbott et al. | 271/245 X |
| 4,473,222 | 9/1984 | Simmons et al. | 271/245 |
| 4,838,408 | 6/1989 | Brawn | 198/434 |
| 4,895,244 | 1/1990 | Flaugher et al. | 198/395 X |

FOREIGN PATENT DOCUMENTS

| | | | |
|---|---|---|---|
| 2104290 | 6/1979 | Fed. Rep. of Germany | 271/245 |
| 0145922 | 11/1980 | Japan | 198/395 |

OTHER PUBLICATIONS

Xerox Disclosure Journal, "Moving Registration Edge", Sloane and McLaughlin, vol. 6 #5, Sep./Oct. 1981.

Primary Examiner—Robert P. Olszewski
Assistant Examiner—James R. Bidwell
Attorney, Agent, or Firm—Robert O. Richardson

[57] ABSTRACT

A conveyer line straightener having a pair of laterally spaced bumpers contractable by conveyer items wherein the bumper first contacted by the item retains it until the second bumper is contacted after which both bumpers release the item.

3 Claims, 2 Drawing Sheets

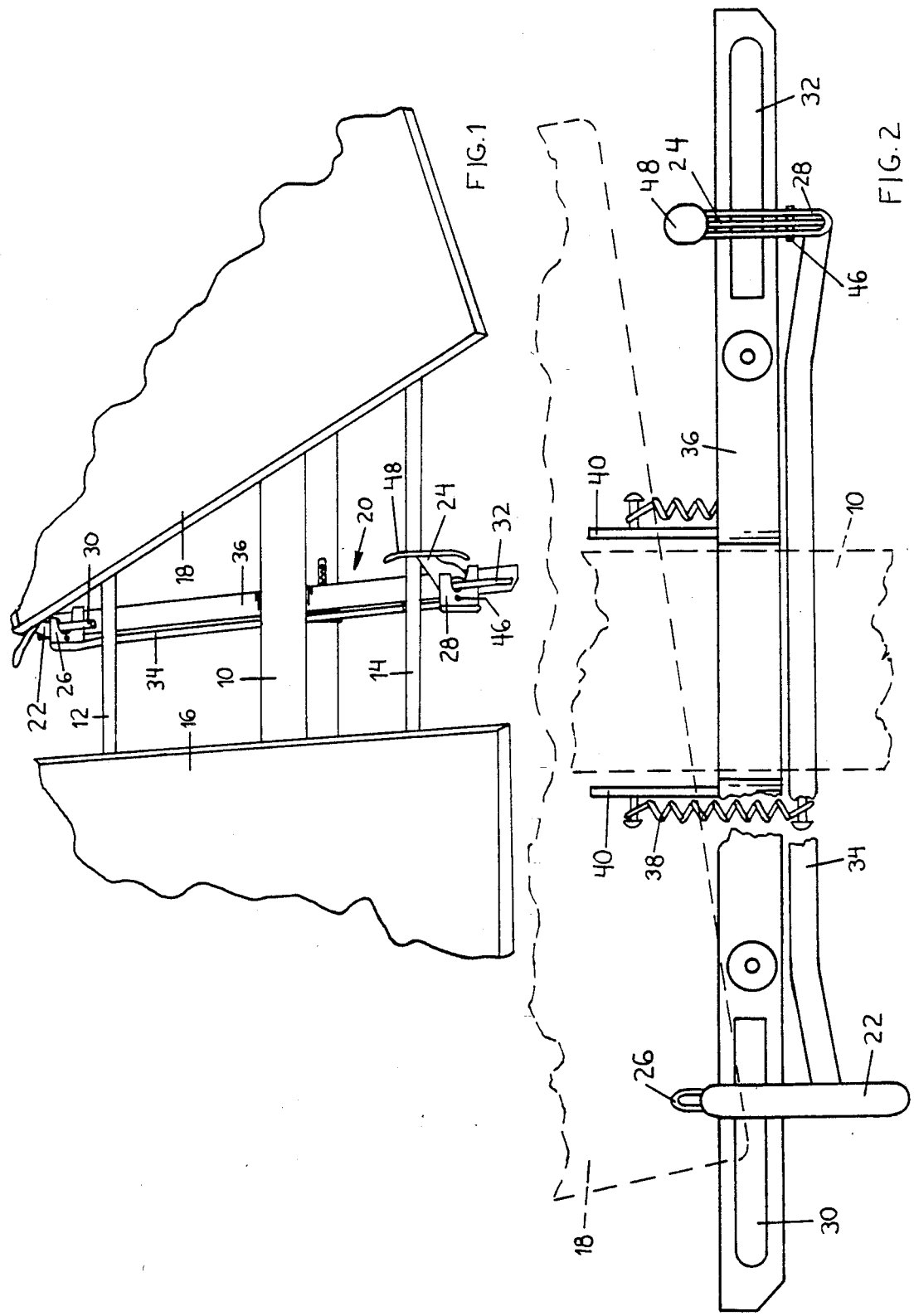

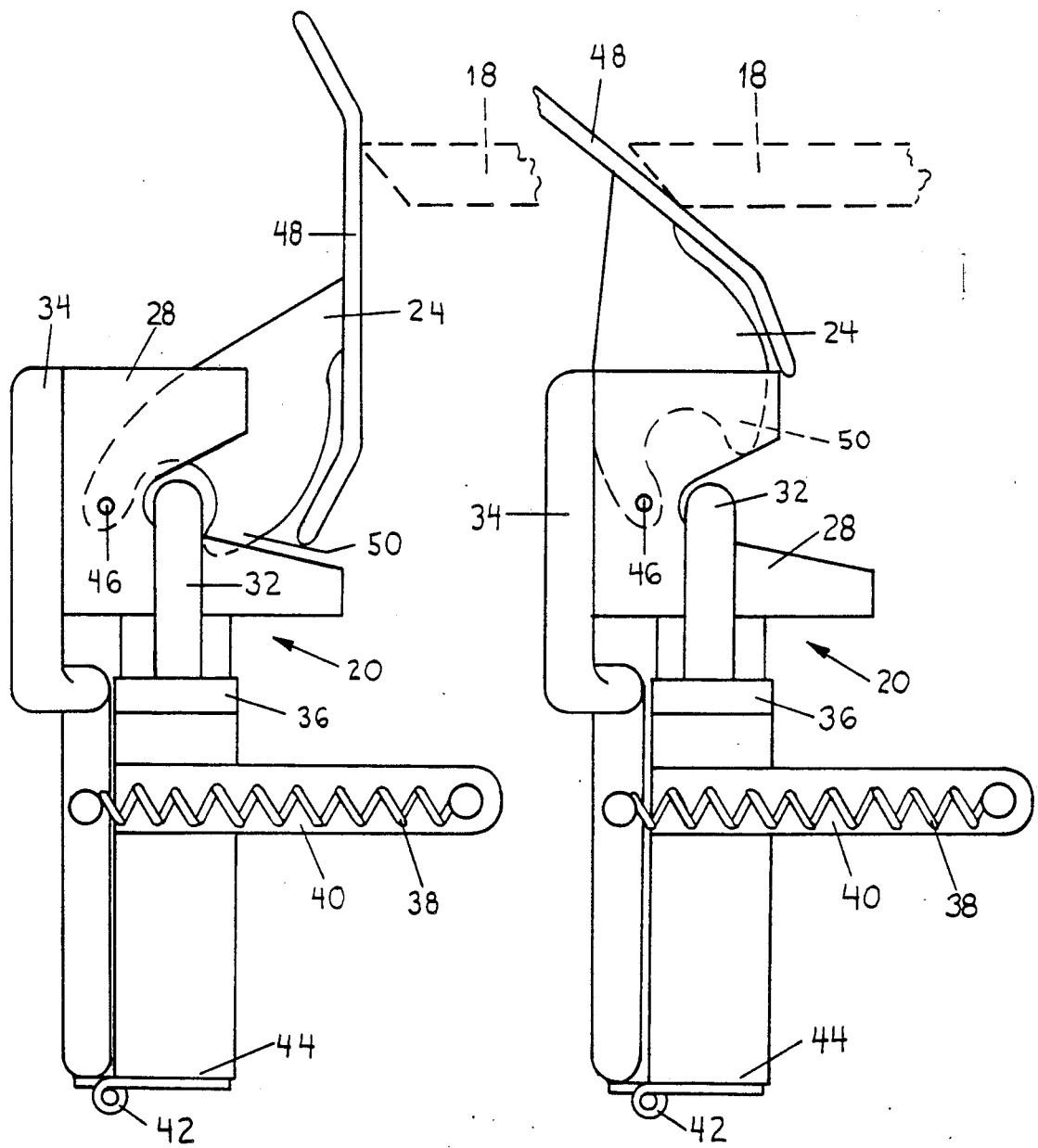

CONVEYER LINE STRAIGHTENER

BACKGROUND OF THE INVENTION

Conveyer lines move items from place to place where work is performed on them. By way of example, a modern bakery will mix a 2000 pound batch of dough for buns, rolls and/or bread. The dough gets treated, pounded, shaped, cut and dropped into shaped containers for baking, cooling, removal, bagging, labeling and stacking for shipment. It is not unusual to have up to 5,000 trays or pans going through this process at the same time. Any jam up or misalignment of pans on the conveyer belt or track can cause severe product loss, equipment damage and costly downtime in production. All dough in the baking area in a conveyer stoppage becomes overbaked and must be discarded. All of these contribute to the cost of the product.

Conveyer line equipment manufacturers have attempted to solve the pan or tray askew and resultant conveyer stoppage problem by magnitizing the conveyer grids on which the metal trays or pans are carried. While they will not shift or turn, if they enter the system crooked they will stay that way. This requires extra care and time in loading. Others use a complex system of electric eyes, timers and switches to stop the systems in the event of crooked or shifting pans. Stopping the movement at any part of the system effects the size, quality and bake of the product. Moreover, these are corrective methods after the problem occurs but are not preventative so as to keep the conveyer line moving.

SUMMARY OF PRESENT INVENTION

In accordance with the present invention a mechanical apparatus is used to prevent conveyer line stoppage due to pan or tray askew. At the critical point along the conveyer path this apparatus assures that the conveyer pans are correctly aligned and in proper position for continues passage of the pans without jamming.

The mechanical apparatus engages the leading forward edge of a misaligned pan and temporily retains its forward edge until the trailing forward edge catches up and is even with the leading forward edge. It then releases the pan for further movement. Since the pan is properly aligned, it continues along the conveyer path with no disruption in the flow of pans along the conveyer line.

Because the apparatus is so inexpensive to make and install, several can be placed in key or known trouble areas in the conveyer system.

The conveyer line straightener of the present invention is a two piece gate which can be adapted to any size or shape of conveyer system. Pans, boxes, trays and other items on the conveyer line must be properly aligned in order to pass through the straightener apparatus. The items if crooked will hit one trigger of the gate and slip or skid on the conveyer until the conveyer surface forces the items to straighten and hit the second trigger. When this happens, both triggers are released and the item moves forwardly in proper alignment If spacing is too close, both triggers are depressed and the next tray passes without stoppage.

BRIEF DESCRIPTION OF DRAWINGS

FIG. 1 is a perspective view of a conveyer line with the mechanical apparatus installed and an approaching tray askew, FIG. 2 is a plan view with one latch open and the other latch closed with a tray shown in dotted lines bumping the open latch, FIG. 3 is a side view with the latch shown in closed position, and FIG. 4 is a side view with the latch shown in open position.

DETAILED DESCRIPTION OF PREFERRED EMBODIMENT

Reference is made to FIG. 1 wherein is shown a conveyer main support 10 and movable carriers 12, 14 which support and move trays 16, 18 along the conveyer path, from right to left in FIG. 1. Tray 16 is properly aligned and tray 18 is askew but approaching the conveyer line straightener 20 of the present invention which will correct its alignment. The straightener has latches 22, 24 at opposite sides of the conveyer path. Both latches must be opened and depressed before tray 18 may proceed along the conveyer path. This happens only when the tray 18 is properly aligned.

As shown in FIG. 1, misaligned tray 18 bumps against latch 22 first and holds up further movement. Latch 22 opens the gate and would let tray 18 pass except that it must also let latch 24 pass the tray 18. When this happens, tray 18 becomes aligned and moves along properly. It is aligned and that is a critical arrangement.

As latch 22 is bumped by tray 18, it opens and releases latch 22. When tray 18 also bumps latch 24 and is in proper alignment, that latch also opens and tray 18 moves along the conveyer path properly aligned.

Latch 22 is pivotally mounted on latch holder 26 and latch 24 is pivotally mounted on latch holder 28. These latches hook over latch catches 30, 32 respectively until the leading edge of tray 18 strikes the latches and pivots them forwardly to free them from the latch catches. A connecting rod 34 connects latch holders 26, 28. Thus, if latch 22 is rotated and freed from latch catch 30, it still will not move out of the path of tray 18 until latch 24 is also rotated and freed from latch catch 32. This can only be done when tray 18 is properly aligned.

Connecting rod 34 passes down under conveyer main support 10, as does mounting bracket 36 on which latch catches 30, 32 are attached. As will be seen in FIGS. 3 and 4, connecting rod 34 is hingedly fastened to mounting bracket 36 under the conveyer main support 10 so that when latches 22 and 24 are moved forward by tray 18, they also pivot downwardly out of the path of tray 18 as it passes over them in proper alignment.

FIG. 2 is a plan view of the conveyer line straightener 20 with a portion of the conveyer main support 10 and tray 18 shown in dashed lines. Both the connecting rod 34 and mounting bracket 36 pass under main support 10 and extend outwardly. Latch catches 30, 32 extend along the top to receive latches 22, 24. Latch holders 26, 28 are at each end of connecting rod 34. Latches 22, 24 are pivotally mounted on holders 26, 28. The pivotal or hinged connection between the mounting bracket 36 and connecting rod 34 is on the underside of both and thus not shown in this view. Parts are broken away to show a coiled spring 38 extending between connecting rod 34 and bracket 40 which extends rearwardly from mounting bracket 36. This is to reset the latches 22, 24 over the latch catches 30, 32 after tray 18 has passed. It should be noted that when a tray is properly aligned, the leading edge bumps both latches which then rotate down and out of the way to permit the tray to move along the conveyer line without interruption.

FIG. 3 is a side view with latch shown in closed position. Mounting bracket 36 has a latch catch 32 on top which is a bar rising from spaced above and extending parallel to the top surface of the mounting bracket. Connecting rod 34 is pivotally mounted by hinge 42 at the bottom to the lowermost part 44 of mounting bracket 36. Latch holder 28 is attached to the upper end of connecting rod 34. Latch 24 is rotatably mounted on latch holder 28 by pivot pin 46. Latch 24 has a bumper 48 which extends above pivot pin 46 so that when tray 18 bears against it (moving from right to left in FIG. 3) the latch 24 rotates counterclockwise about pivot pin 46. The hook portion 50 rises up and over latch catch 32, freeing latch 24 from latch catch 32. This position is shown in FIG. 4.

In FIG. 4 latch 24 has been opened by tray 18 but the latch holder 28 and connecting rod 34 has not yet been rotated counterclockwise about hinge 42. This is because tray 18 has not yet opened the other latch which, through connecting rod 34 keep the latch holder 28 in the upright position shown.

Assuming tray 18 ia properly aligned, the other latch will be freed from its latch holder and further movement of tray 18 will then cause both latches and latch holders to rotate counterclockwise about hinge 42. After the tray 18 has passed, spring 38 connected at one end to connecting rod 34 and the other end to a rearwardly extending bracket 40 on mounting bracket 36 will return connecting rod 34 with latch holders 28 (and 26 in FIG. 1) to its upright position as shown in FIG. 3. It is ready to straighten the next tray if it needs it, or let the tray pass undisturbed if it is already properly aligned.

While the foregoing description relates to a preferred embodiment of my invention it is to be understood that my invention is not limited thereby. Numerous improvements and modification will become apparent after understanding the foregoing, and these alterations and deviations from the preferred embodiment are to be considered as part of my invention as set forth in the following claims.

What I claim is:

1. A conveyer line straighter for properly aligning items passing along a conveyer line, said straightener comprising: a pair of bumpers laterally spaced apart across said line, each of said bumpers being depressible by said items, each of said bumpers being depressible by said items, said bumpers having interconnection means whereby an untouched first bumper untouched by said item in place to retain said item until said item also contacts said untouched first bumper at which time both said bumpers release said item for further movement, said interconnection means including a pair of pivotal latches with said bumpers attached thereto, said latches being pivotally mounted onto latch holders, a connecting rod, said latch holders being connected to the ends of said connecting rod, a mounting bracket, said connecting rod being pivotally attached to said mounting bracket, latch catches fixedly attached to said mounting bracket, said latches being retained by said latch catches and retaining said bumpers in an upright position until released by conveyer items contacting both said bumpers.

2. A conveyer line straightener as in claim 1 wherein spring means urges said connecting rod into upright position and said latches into engagement with said latch catches.

3. A conveyer line straightener as in claim 2 wherein said mounting bracket has a spring bracket extending rearwardly therefrom, said spring means interconnecting said spring bracket with said connecting rod above the pivotal attachment of said connecting rod with said mounting bracket.

* * * * *